(12) United States Patent
Petroff

(10) Patent No.: US 7,672,797 B2
(45) Date of Patent: Mar. 2, 2010

(54) FLOW MEASUREMENT IN PARTIALLY FILLED PIPES USING PULSED PEAK VELOCITY DOPPLER

(75) Inventor: Alan M. Petroff, Huntsville, AL (US)

(73) Assignee: ADS LLC, Huntsville, AL (US)

( * ) Notice: Subject to any disclaimer, the term of this patent is extended or adjusted under 35 U.S.C. 154(b) by 0 days.

(21) Appl. No.: 11/880,262

(22) Filed: Jul. 20, 2007

(65) Prior Publication Data

US 2008/0047358 A1    Feb. 28, 2008

Related U.S. Application Data

(60) Provisional application No. 60/832,183, filed on Jul. 20, 2006.

(51) Int. Cl.
| G01F 1/00 | (2006.01) |
| G01F 17/00 | (2006.01) |
| G01F 23/00 | (2006.01) |
| G01P 11/00 | (2006.01) |
| G01S 13/00 | (2006.01) |
| G01S 15/00 | (2006.01) |

(52) U.S. Cl. .............. 702/50; 702/45; 702/46; 702/55; 702/100; 702/142; 702/143; 73/170.11; 73/510

(58) Field of Classification Search .......... 702/50, 702/45, 55, 100, 143, 46; 73/170.11, 510, 73/861.25, 861.27
See application file for complete search history.

(56) References Cited

U.S. PATENT DOCUMENTS

| 4,083,246 A | 4/1978 | Marsh |
| 4,116,061 A | 9/1978 | Petroff |
| 4,295,197 A | 10/1981 | Petroff |
| 4,344,329 A | 8/1982 | Petroff |
| 4,386,409 A | 5/1983 | Petroff |
| 4,397,191 A | 8/1983 | Forden |
| 4,407,158 A | 10/1983 | Petroff |
| 4,630,474 A | 12/1986 | Petroff |
| 5,020,374 A | 6/1991 | Petroff et al. |
| 5,198,989 A | 3/1993 | Petroff |
| 5,208,785 A | 5/1993 | Brumley et al. |
| 5,226,328 A | 7/1993 | Petroff et al. |
| 5,333,508 A | 8/1994 | Petroff et al. |
| 5,333,614 A * | 8/1994 | Feiring .................. 600/466 |
| 5,371,686 A | 12/1994 | Nabity et al. |
| 5,421,211 A | 6/1995 | Heckman |
| 5,467,650 A | 11/1995 | Cushing |

(Continued)

*Primary Examiner*—Eliseo Ramos Feliciano
*Assistant Examiner*—Janet L Suglo
(74) *Attorney, Agent, or Firm*—James Richards

(57) ABSTRACT

The present invention relates to a system and method for measurement of flow velocity using the transmission of a sequence of coherent pulsed ultrasonic signals into the flow, and sampling the received response signal at a predetermined delay time relative to the pulse transmission that does not correspond to the signal transmission time. The sampling may be coherent with a frequency offset from the coherency frequency of the pulses. The received signal samples are then spectrally processed, typically by a Fourier process, to generate a frequency domain data set. A threshold technique is used on the frequency domain data set to determine a peak Doppler shift. Average velocity is then obtained by multiplying the peak Doppler shift by a factor, for example, 0.90. In one embodiment, the transmit pulse and receive samples are interleaved by alternating between transmitting a pulse and, after a delay, sampling the received signal.

19 Claims, 9 Drawing Sheets

U.S. PATENT DOCUMENTS

| | | |
|---|---|---|
| 5,473,948 A | 12/1995 | Moss et al. |
| 5,483,499 A | 1/1996 | Brumley et al. |
| 5,615,173 A | 3/1997 | Brumley et al. |
| RE35,535 E | 6/1997 | Brumley et al. |
| 5,811,688 A | 9/1998 | Marsh et al. |

* cited by examiner

Fig. 6
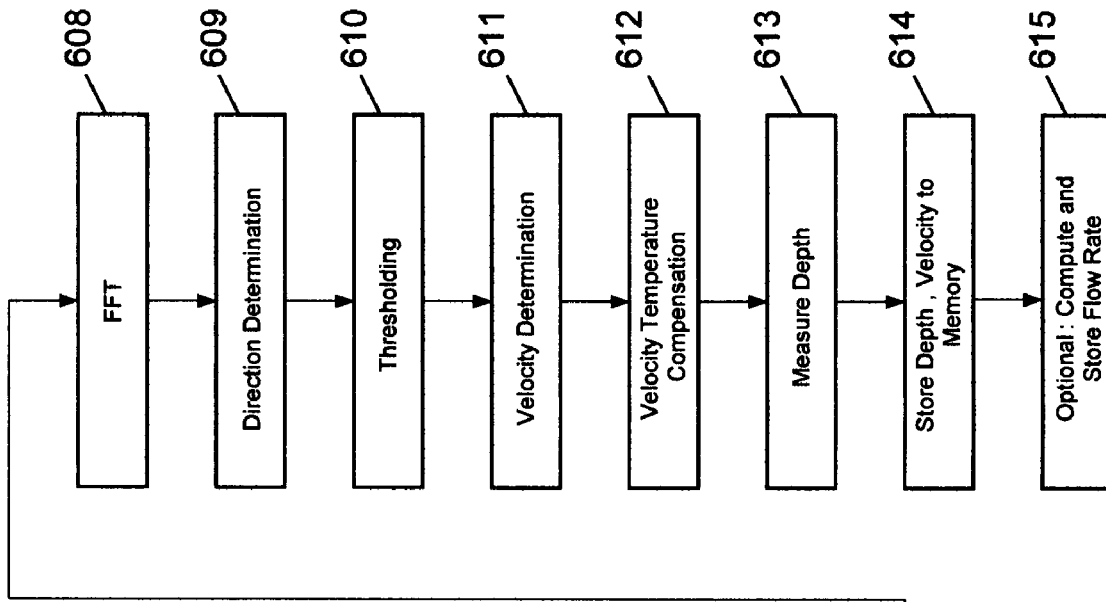
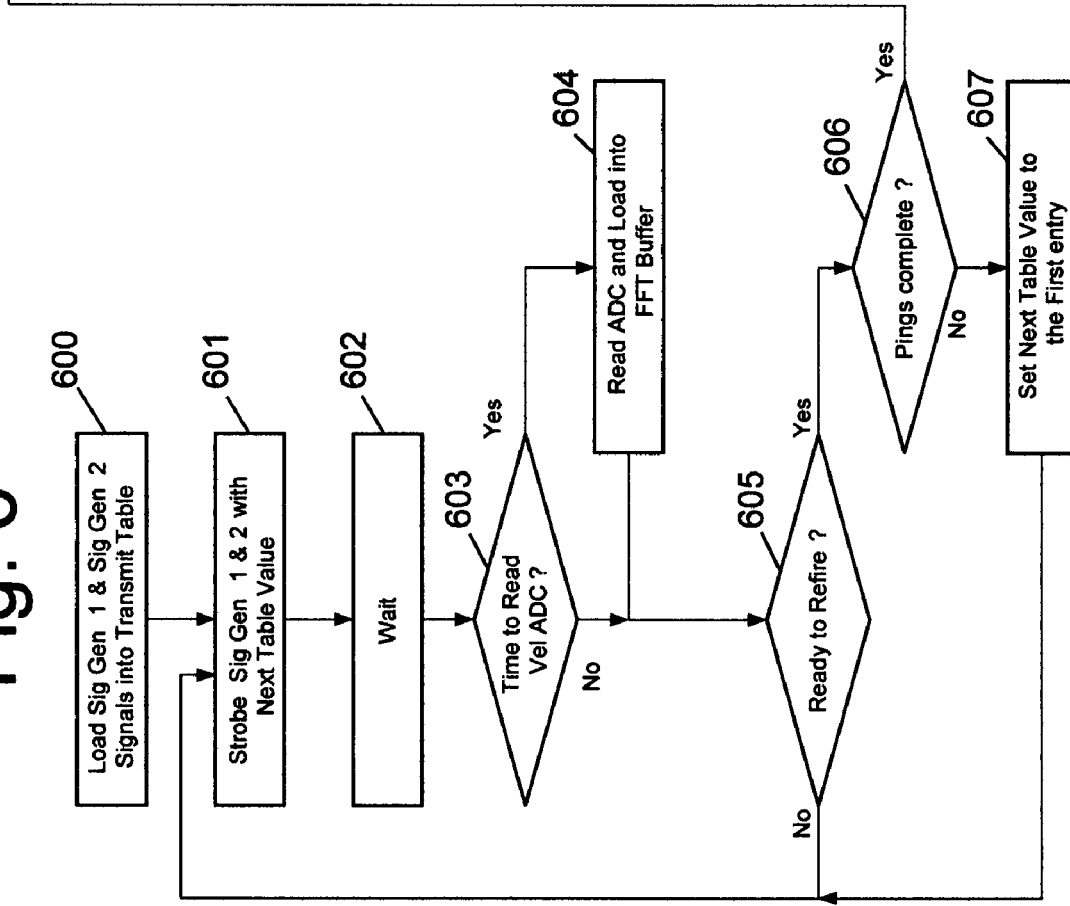

FLOW MEASUREMENT IN PARTIALLY FILLED PIPES USING PULSED PEAK VELOCITY DOPPLER

RELATED APPLICATIONS

This application is an application claiming the benefit under 35 USC 119(e) of prior U.S. Provisional Application 60/832,183, titled "Hydraulic Flow Monitoring System", filed Jul. 20, 2006 by Petroff, which is hereby incorporated herein by reference in its entirety.

BACKGROUND

1. Field of the Invention

The present invention pertains generally to the field of measurement of water flowing in partially and completely full pipes using a sensor that is in contact with the flow, more particularly, to the class of devices that utilize ultrasonic energy and measurement of the Doppler Effect as a means to determine the channel velocity.

2. Background of the Invention

There are many cases where it is important to measure the rate of flow in a pipe. For example, one may need to know the flow rate to determine a billing rate between two communities, to assess the rate at which rain or ground water is entering the sewage system, to design a system expansion, or to control the rate at which a holding tank is filled or emptied. In measuring such flows there are periods when the conduit may be empty of fluid, partially full or completely full. The flow may be free flowing (propelled only by the force of gravity). It may be constrained by an obstruction or other down stream constraint. It may be flowing downstream due to an upstream pressure head, or it may be flowing upstream (in a reverse direction) owing to a downstream pressure head. Flow in all of these cases is determined by the Continuity Equation:

$$Q=AV$$

where, Q is the flow rate, A is the cross-sectional area of the flow and V is the average velocity of the flow. The cross-sectional area is relatively easy to measure. One need only know the geometry of the pipe and the depth of flow. One can measure the diameter of the pipe or, if the pipe is non-circular, determine the geometry by direct measurement. There are a wide variety of depth measurement technologies with which one can determine the depth flow. These depth measurement technologies include mechanical floats, air bubblers, pressure sensors, ultrasonic sensors, capacitance sensors or radio frequency based devices.

However the average velocity is difficult to measure because the flow velocity through the cross-section of flow varies greatly. At the edge of the pipe, the velocity is close to zero and velocity increases quickly to a maximum and then decreases as it approaches the surface of the water or the far edge of the pipe.

Velocity measurement systems must operate over a large range of conditions. The typical sewer pipe has a diameter of 12 or less inches (30.5 cm) and normally has less than 2" (5 cm) of flow. Depth of flow can vary from empty to full at velocities between slightly negative (<−2 ft/sec=−61 cm/sec) to very fast (10-15 ft/sec=3.05-4.57 m/sec). The largest pipes are normally not more than a meter or so in diameter with depth of flows varying from a several centimeters to a meter or so.

There are a number of systems that measure a point velocity in the flow and then predict the average velocity based on this measurement and the knowledge of the location of that measurement Montedoro-Whitney, Marsh U.S. Pat. No. 4,083,246 and Cushing U.S. Pat. No. 5,467,650. In sewers, such systems may have difficulty either if the sensor is placed too close to the edge (where all flows are zero) or may foul if placed to deep into the flow.

There are systems that make use of the Doppler Effect and the transmission and reception of ultrasonic energy into the flow to determine velocity. These systems fall into two classes, systems that utilize Continuous Wave (CW) or Pulsed ultrasonic transmissions. These classes further divided into systems that measure average velocity and systems that measure some intermediate indictor and then predict the average velocity based on that indicator. Such systems may utilize either Continuous Wave (CW) or Pulsed ultrasonic transmissions.

One example of the first class of systems, Nabity et al, U.S. Pat. No. 5,371,686, uses the transmission and reception of CW ultrasonic signals, Fourier transform processing on the received signals, and a process that uses the largest coefficient to normalize the signal and then averages certain weighted signals to produce a measure of the average velocity.

A distinct issue with such systems is that they interpret signal strength as a measure of velocity and then weight these numbers to provide an average velocity. Signal strength may be a measure of velocity but also correlates to size and reflectivity of particles. Other parasitic effects such as surface reflections, screening of distant particles by closer particles can also be a source of error.

Another system (Petroff U.S. Pat. No. 5,020,374 and Petroff U.S. Pat. No. 5,333,508) uses the transmission and reception of CW ultrasonic signals, Fourier transform processing on the received signals and various threshold and averaging techniques to determine the peak velocity in the flow. Average velocity is then determined to be approximately 90% of this peak value. One advantage of this approach is that it obviates issues associated with determining interpreting signal strength and mean velocity.

One significant limitation of such CW systems is that the received signal (generally very weak) must be sensed in the presence of the continuous and very strong transmitted signal. Not only does this make the measurement of very weak distant signals difficult, but it also makes it difficult to measure very slow flows. Very slow flows offer very little Doppler Shift and are therefore easily masked by the transmitted signal. Similarly, this makes it more difficult to distinguish between slow negative and slow positive flow. This problem is compounded if the sensor becomes fouled. In such cases, the coupling from transmit to receive can increase thus increasing useless crosstalk and while attenuating the signal received from distant particles. This is analogous to listening to music while holding a pillow over one's head and screaming. Useful information (music) is attenuated and the increased coupling by the pillow makes it more difficult to distinguish the scream from the music.

The second class of ultrasonic devices employs Pulsed Doppler transmissions and receptions. One such system (Petroff U.S. Pat. No. 5,226,328) describes a means of using pulsed Doppler to receive a signal from a selected volume of fluid some distance from a transducer and to then integrate that signal to produce a signal representative of the average velocity. Another example is an acoustic Doppler flow profiler described by Brumley et al. in U.S. Pat. No. 5,208,785 and subsequent fillings. Such current profilers measure the velocity in cells along a transmitted beam and then produce an average velocity estimate that is a function of the velocity in each of the measured cells. Such devices are known to work well in large pipes and deep flows but tend to be expensive and also have limited functionality if the flow is too shallow (i.e less than a few centimeters).

Therefore, there is a need for a flow sensor that accurately and economically measures flow velocity, including low flow and reverse flow, in a pipe over the full range of fill percentages without substantially interfering with the flow and may operate for extended periods in remote unattended locations.

BRIEF DESCRIPTION OF THE INVENTION

The present invention relates to a system and method for measurement of flow velocity using the transmission of a sequence of coherent pulsed ultrasonic signals into the flow, and sampling the received response signal at a predetermined delay time relative to the pulse transmission that does not correspond to the signal transmission time. The sampling may be coherent with a frequency offset from the coherency frequency of the pulses. The received signal samples are then spectrally processed, typically by a Fourier process, to generate a frequency domain data set. A threshold technique is used on the frequency domain data set to determine a peak Doppler shift. Average velocity is then obtained by multiplying the peak Doppler shift by a factor, for example, 0.90.

In one embodiment, the transmit pulse and receive samples are interleaved by alternating between transmitting a pulse and, after a delay, sampling the received signal. The pulse may be shorter than the delay, producing a series of sensing range shells in the flow.

One embodiment determines direction of flow based on an integral of spectral response greater than an offset frequency compared with an integral of spectral response less than the offset frequency.

By transmitting pulses and then sampling the return signal when the transmitter is off, the impact of transmit signal coupling can be effectively ignored. This effectively increases the dynamic range of the system, allows the sensing of weaker signals and facilitates distinguishing between signal and noise. It allows operation without variable gain amplifiers and without a carrier notch filter. This simplifies system design, reduces cost, reduces noise, allows flows of as low as 0.1 ft/s (3 cm/sec) to be readily measured, and makes the determination of velocity direction more robust. Because this technique does not rely on the measurement of velocities in specific flow volumes or cells, it is suitable for monitoring flows in pipes that have as little as 1 inch (2.5 cm) or less depth.

This invention will provide a measure of average flow velocity. In order to compute a flow rate, this invention may be coupled with a depth sensing technology. Total flow may be found by multiplying average flow velocity by a flow area computed from a measured depth in a known pipe profile.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 6 is a flow chart that describes the data acquisition and signal processing approach.

DETAILED DESCRIPTION OF THE INVENTION

Figure 1:
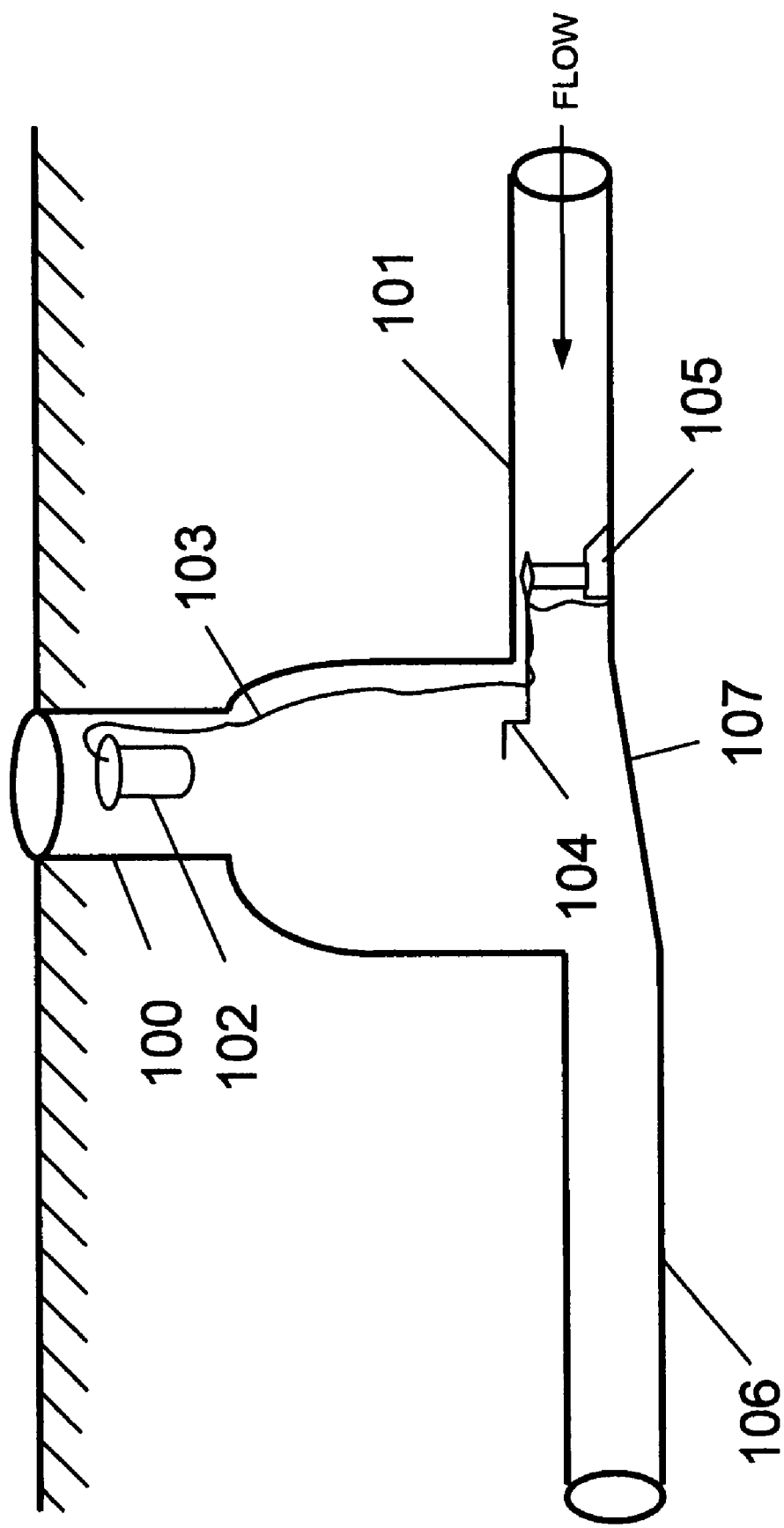
FIG. 1 is a sketch of a typical installation of the device. Highlighted are the manhole, entrance and exit pipes, data logger, installation means and sensor.

Turning, now, specifically to FIG. 1, a transmitting and receiving ultrasonic sensor 105 is mounted on an expandable scissors jack mounting ring 104 and is installed in the influent pipe 101 of manhole 100. The scissors jack mounting, as described in Petroff U.S. Pat. No. 4,116,061, is ideal for installation in smaller diameter pipes. U.S. Pat. No. 4,116,061, titled "Sewer Line Analyzer Probe," issued Sep. 26, 1978 to Petroff is hereby incorporated herein by reference. In the arrangement of FIG. 1, the sensor is preferably positioned at the bottom of the pipe such that it is "looking" up stream. If silt, rock or other debris is present, then the sensor and ring can be installed such that the ring is in contact with the pipe wall (and beneath the debris) but the sensor is located above the debris on the side of the pipe. In all cases, the sensor should be installed below the surface of the water, or in the case of a normally dry pipe, at a point in the pipe where the flow is expected to be present. In larger diameter pipes, the ring may not be practical. In such cases, the sensor could be mounted on a simple band of aluminum and fastened to the wall using anchor bolts. Once again, the sensor should be positioned such that the sensor is below the lowest expected flow, or in the case of a dry pipe, below the minimum expected flow. While the sensor could be installed either in the influent pipe 101 or the effluent pipe 106 or even in the manhole invert 107, the hydraulic flow conditions in the influent pipe are almost always far superior and lend themselves to more accurate flow readings. Sensor 105 is connected through cable 103 to a water proof signal processor/data logger 102 that contains the signal processing, data logging, communications electronics, power supplies and batteries.

Figure 2:
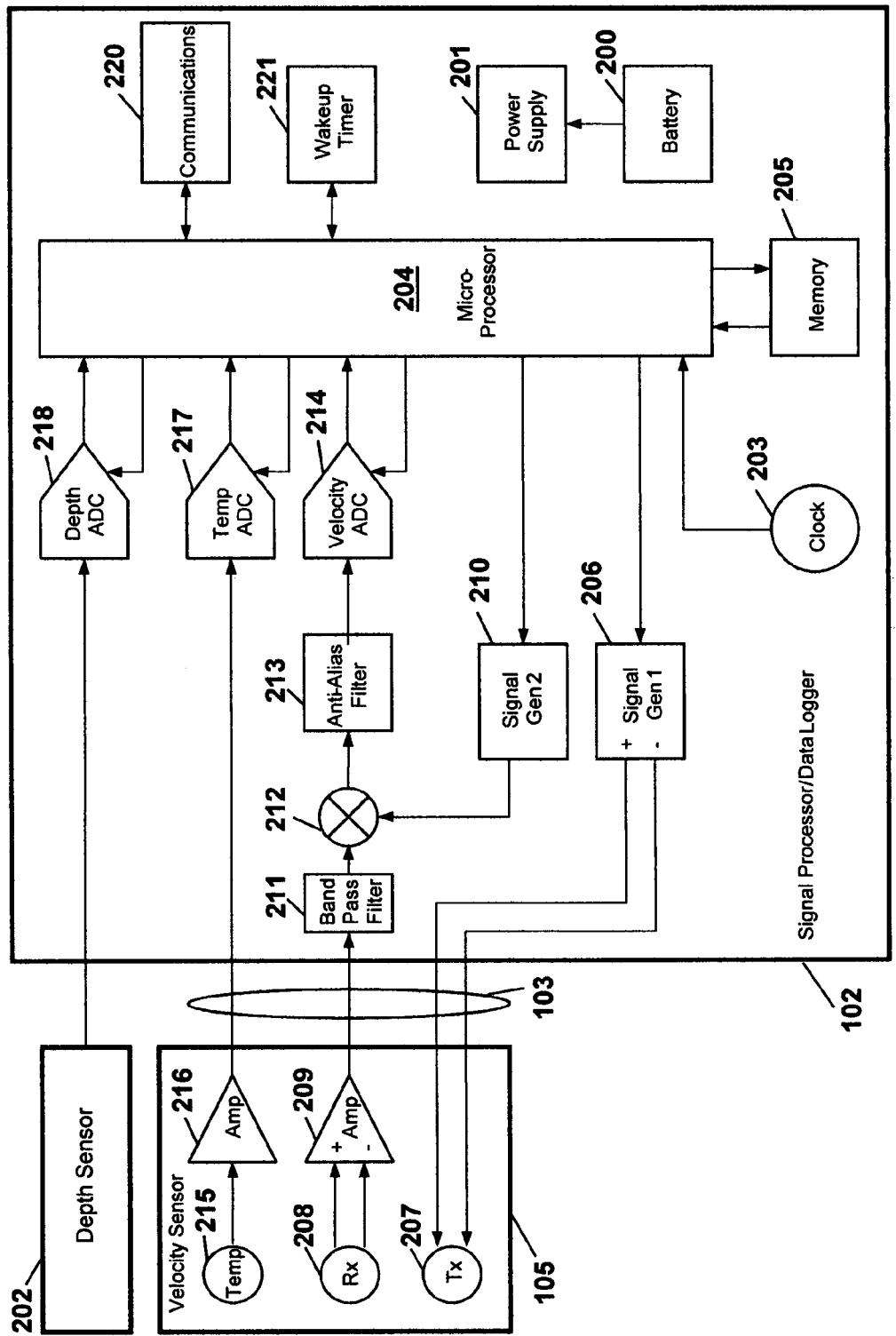
FIG. 2 is a block diagram of the electronics showing the velocity sensor, the depth sensor and the signal processing and data logging electronics.

FIG. 2 is a block diagram of the system illustrating the electronic aspects of the invention. The block diagram contains three major elements, the previously referenced signal processor/data logger 102, previously referenced sensor 105 and depth sensor 202. Battery pack 200 provides power to regulators 201 which in turn power the rest of the unit. The batteries are typically alkaline primary AA or D cells, but it is also possible to use rechargeables. Since long life is desired, effort is taken to insure that all electronics are either powered off or placed in low power consumption modes when they are not in use. Clock 203 provides a coherent clock for the system. In particular, this clock is used to insure that all of the signals transmitted, received and processed are done so coherently. In this instantiation, Microprocessor 204, an ATMEL926 (ARM 9 based processor), will receive the clock signal and will use it as the timing signal to drive Signal Generators 206 and 210 (14 bit digital to analog converters) and receive data through velocity analog to digital convert 214 (16 bit) such that it can be synchronously and coherently processed. More specifically, microprocessor 204 will create a transmit pulse train by loading a series of digital words from memory 205 out to Signal Generator 206. Signal Generator 206 will convert the digital data stream into an analog waveform which will be transmitted through cable 103 to the ultrasonic transmit crystal 207. More particularly, for this exemplary embodiment, the series of digital words comprise a series of samples for six sine wave cycles at 250 kHz, sampled at a clock frequency of 2 MHz. This method of generating the drive signal from a sequence of DAC values enables generation of any desired number of cycles over a range of frequencies not necessarily related to the clock 203 by a convenient divider ratio. The transmit signal will be transmitted into the flow, where the energy will reflect, with a corresponding Doppler Shift, from particles in the flow. The reflected energy will be sensed by ultrasonic receive crystal 208. Ultrasonic crystals 207 and 208 are piezoelectric crystals typically with a center frequency of 250 kHz. The center frequency was chosen on the basis of the physical size of the crystal, beam pattern and wavelength in the flow. Basically, one wants to select a crystal size that is small enough to offer minimum disturbance to the flow, provide a wavelength that is smaller than the typical particle size found in flow, but not so small that the particles in the flow present a highly reflective or lossey medium and provide a broad enough beam pattern so that the sensor can have a wide field of view to "see" the maximum flow velocity in the water independent of where that peak may occur in the flow and relative to where the sensor might be installed. As a practical matter, the sweet spot of frequency selection is between 100 kHz and 2 MHz. It is also preferable that the signal generators 206 and 210 are clocked at a rate higher than twice the Nyquist rate of the selected crystal center frequency, e.g., higher than 500 kilo samples per second for the 250 kHz center frequency.

The signal from receive crystal 208 is amplified by amplifier 209 and transmitted through cable 103 to band pass filter 211. The filter attenuates uninteresting and potentially interfering signals that may be present at frequencies outside the band of interest, i.e. near 250 kHz. The output of filter 211 is mixed with the output of signal generator 210 in four quadrant mixer 212. This down coverts the signal to baseband. Note that signal generator 210 includes a digital to analog converter and receives its input from microprocessor 204 and memory 205. This input is selected such that it will beat the input signal such that the mixer output will a) be a 500 Hz signal when the flow velocity is zero, b) will be greater than 500 Hz when the flow velocity is greater than zero, and c) will be less than 500 Hz when the flow velocity is negative (i.e., flowing upstream). Anti-aliasing filter 213 receives the output of the mixer, attenuates signals higher than the range of interest (in this case 2500 Hz) and sends the signal to velocity analog to digital converter 214 where it is converted to a digital word on command from microprocessor 204. (Analog to digital converter may also be referred to as ADC) Note that microprocessor 204 will sample the velocity ADC coherently with respect to clock 203. A description of the signal timing and data processing will be described after the hardware description is completed.

Two final pieces of information are desired: water temperature and water depth. Since the speed of sound in water is a function of water temperature, it is advantageous to measure the water temperature so that such any measure of velocity can be appropriately compensated for variation in temperature. Accordingly, temperature sensor 215 is installed in sensor assembly 105. The output of the temperature sensor is amplified by amplifier 216, and sent through cable 103 to the signal processor/data logger 102 where, on command from microprocessor 204, it can be measured by temperature A to D converter 217.

A wide variety of technologies are available to measure depth of flow in the pipe. Such technologies typically provide a voltage output proportional of the depth of flow. For example, depth sensor 202 could be a pressure sensor mounted either adjacent to, or as a sub assembly inside, sensor 105. The output of depth sensor 202 would then be transmitted through its own cable, or through cable 103, to the signal processor/data logger 102 and hence to depth analog to digital converter 218 where it would be sampled on demand by microprocessor 204.

Two final hardware items warrant description: measurement rate and communications. The description to this point describes the hardware required to take a single measurement. However, signal processor/data logger 102 is also a data logger and as such will take these measurements at some rate. Typically, this sampling rate is determined by a wakeup timer 221 that has been programmed by the user to operate a fixed rate. Common sampling rates in the sewage monitoring industry are 2 minute, 2.5 minute, 5 minute and 15 minute sampling rates. This wakeup function could implemented as a separate hardware block or could be provided as a standard feature with the selected processor. In point of fact, the preferred embodiment utilizes an ATMEL 926 processor that includes this functionality internal to the processor. While operation at a fixed rate is the common operating condition, it is also possible to program the microprocessor such that it takes readings at variable rates. For example, it might increase and decrease its sampling rate if the flow rate exceeds or drops below threshold values.

Finally, all data loggers need a means of entering configuration data into the unit and, at some point, extracting collected data. Configuration information could include such information as pipe diameter, site name, sensor configuration, sampling rates, thresholds and constants specific to the depth sensor technologies. Communications to the data logger would be provided by communications electronics 220. This block could be implemented to support a variety of interfaces including: RS-232, RS422, infrared (IR), Bluetooth, 802.11, 802.15, leased telephone line, dialup telephone, cell phone, satellite communications, etc.

Figure 3:
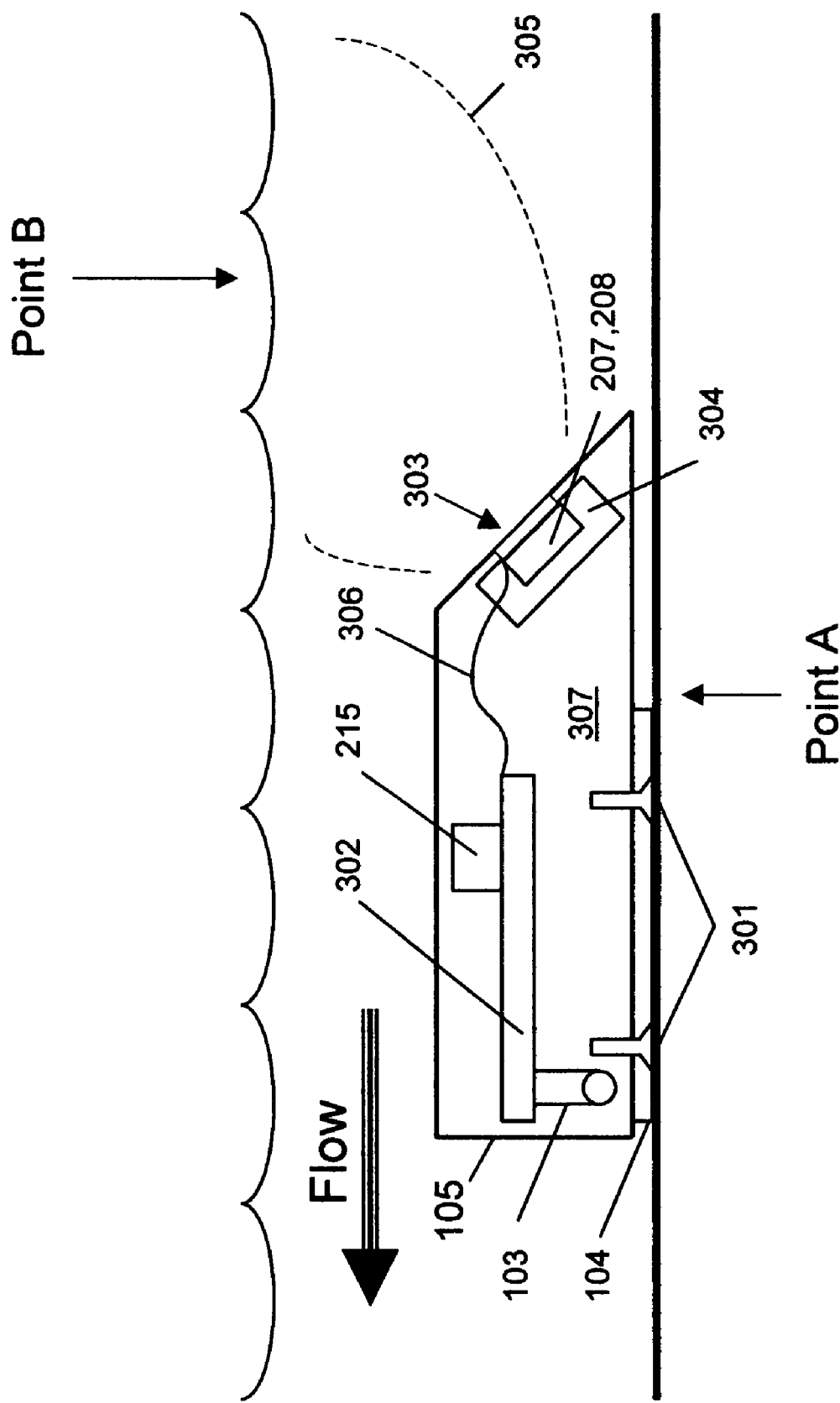
FIG. 3 is a profile sketch of a typical sensor showing the piezoelectric ultrasonic crystals, internal acoustic coupling and isolation materials, approximate beam pattern, internal electronics (temperature sensor, electronics printed circuit board and cabling), mounting apparatus, mounting screws and two candidate locations for depth measurement.

Turning now to FIG. 3, a velocity sensor 105 is shown in profile with all of its constituent components. Note that all of the components inside the sensor are encapsulated in epoxy 307 such that they are all protected from the destructive impact of the flow. Sensor 105 is mounted to ring 104 by a pair of screws 301. Sensor cable 103 enters the sensor from the side and terminates on printed circuit board 302. Cable 103 provides the signaling wires for the various sensors as well as any ground and power wires that might be needed to drive the local electronics. Included on the printed circuit board 302 are various previously described amplifiers. Temperature sensor 215 merits additional comment in that it should be mounted on the printed circuit board such that it is located as close as possible to the edge of the sensor/water boundary. This mounting insures that the sensor will more readily respond to changes in the water temperature. Printed circuit board 302 is connected by four wires (shown collectively as 306) to ultrasonic crystals 207 and 208. In order, to minimize mechanical coupling between the ultrasonic crystals, they are individually embedded in an acoustically absorbent material such as cork 304 or any of a number of common closed cell foams. The crystals are protected from contact to the water by a thin layer of epoxy 303. The beam pattern of the sensors is roughly represented by the dashed lines labeled 305. As previously mentioned, the beam pattern should be relatively broad so as to fully ensonify the water flowing in front of the sensor. This allows the peak velocity to be detected even if the sensor is installed off center in the pipe, or at an odd angle, or if the peak velocity is not directly in front of the sensor.

The depth of the flow may be measured by a pressure sensor mounted with the sensor assembly 105 at point A in FIG. 3. Alternatively, since the depth of flow may be disturbed by the presence of the sensor assembly 105, flow depth may be measured at point B in FIG. 3 using a pressure sensor or other technique, such as ultrasound through the air from above.

Figure 4:
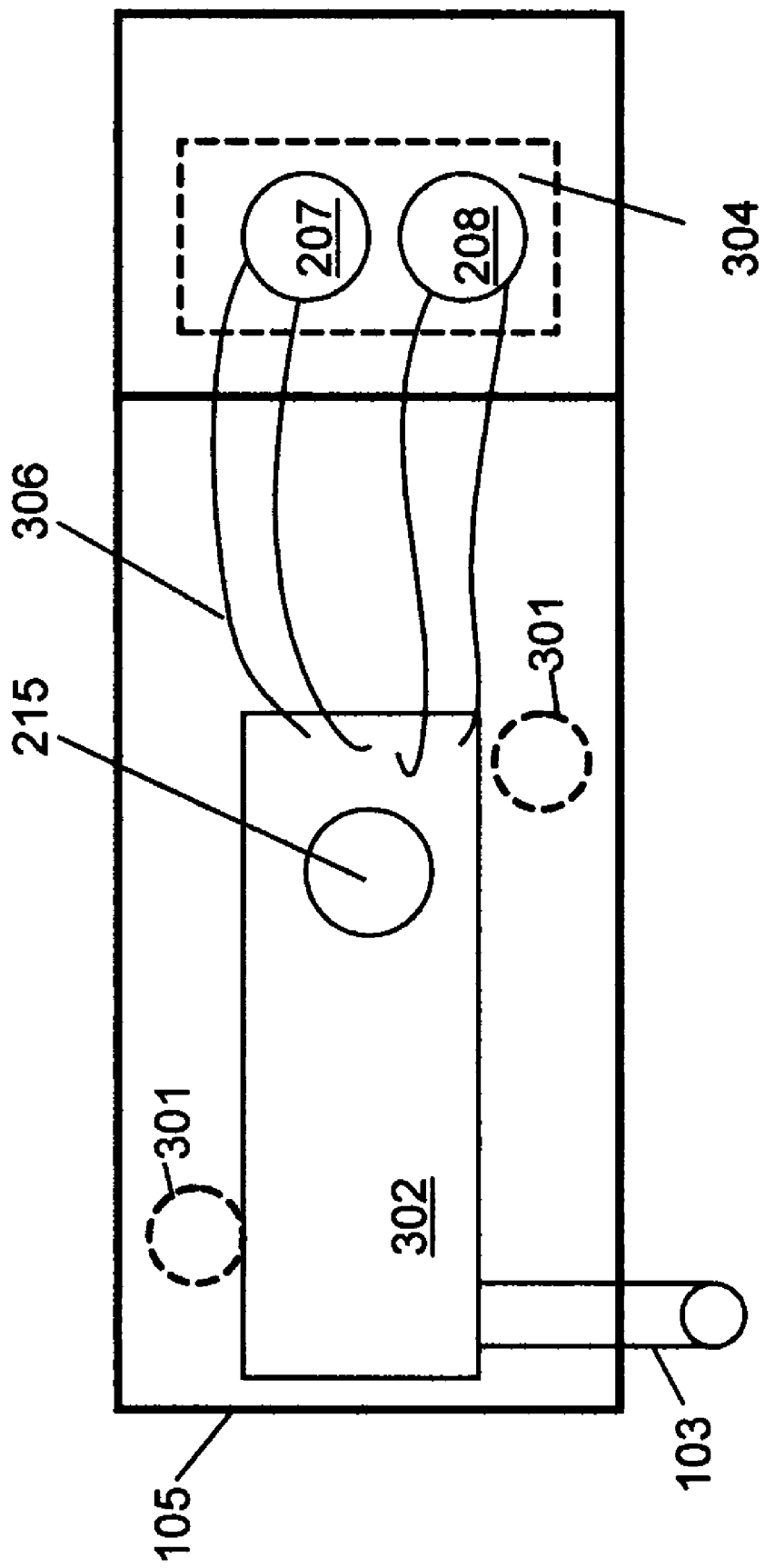
FIG. 4 is a top view sketch of the typical sensor shown in FIG. 3.
Figure 5:
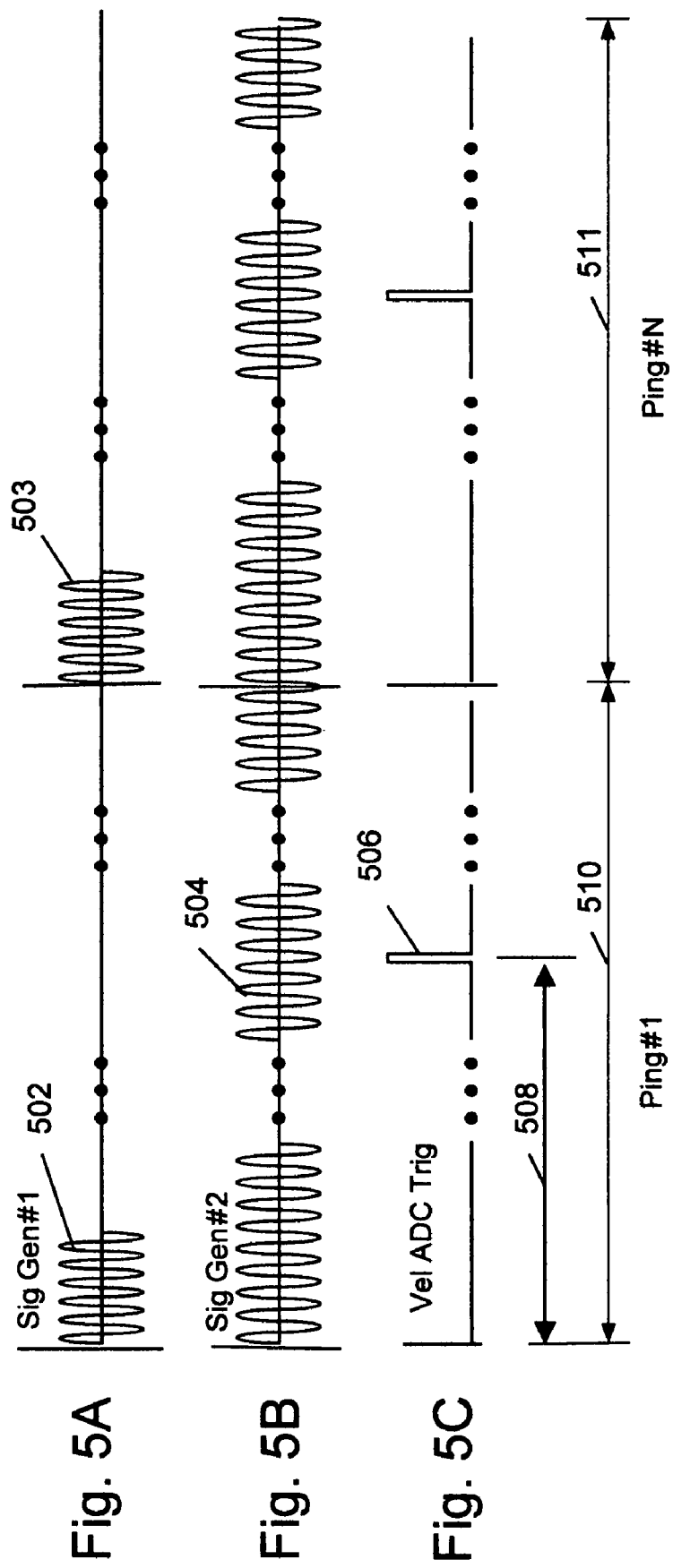
FIG. 5A, FIG. 5B and FIG. 5C are timing diagrams that illustrate the key coherent transmit and receive signals.

Turning now to FIG. 4, sensor 105 is shown in top view. FIG. 4 shows the separation of the ultrasonic crystals 207 and 208 with the cork 304 or other acoustic isolation materials and the four wires 306 connecting the crystals to printed circuit board 302. Cable 103, printed circuit board 302, mounting screws 301 and temperature sensor 215 have been previously described.

This concludes the description of the hardware. FIGS. 5, 6, 7A, and 7B describe the signal processing.

FIG. 5A-FIG. 5C show exemplary timing associated with the coherent transmission and reception of velocity signals. Shown are three signals that illustrate voltage as a function of time. From top to bottom are FIG. 5A, the signal 502, 503 sent by signal generator 206 to the transmit crystal 207, FIG. 5B, the signal 504 sent by signal generator 210 to mixer 212, and FIG. 5C, the triggering signal 506 sent by microprocessor 204 to velocity analog to digital converter 214. All of these signals are derived from the same clock and are synchronous, thereby ensuring coherency of the signal processing. FIG. 5A shows the transmit pulse 502 and 503 comprising six sine wave cycles at 250 kHz. Four to ten cycles are preferred. The number should be less than the delay from start of transmit to receive sampling to prevent transmit energy from overloading and interfering with the receive process. Two pulses are shown, a first pulse 502 for ping 1, 510 and a second pulse 503 for ping 2, 511. The number of waveforms depends on the bandwidth of the crystal. One should send enough waveforms to excite the crystal such that the crystal will produce the maximum peak voltage, i.e., the pulse length is sufficient to excite the transmitter crystal substantially to a steady state condition before termination of the pulse. For the selected crystal and the selected center frequency this number proved to be six cycles. Transmitting more than the preferred number of waveforms provides no valuable improvement. Providing less than the preferred number reduces the transmit energy.

FIG. 5B shows the generation of a slightly different frequency signal for mixer 212. Two features are important in this waveform. First, the frequency of the waveform is slightly lower. The frequency is preferably exactly 500 Hz less than the value sent to the transmit crystal or 249,500 Hz. This provides an offset which allows the system to distinguish between and quantify positive and negative flows. Second, this signal 504 must be presented to mixer 212 during the time in which the mixer output is sampled by the velocity analog to digital converter 214. As shown in FIG. 5B, the mixer drive signal 504 is a continuous sine wave.

FIG. 5C shows the timing of the trigger signal 506 to the velocity analog to digital converter 214. Note that this trigger 506 occurs well after the transmit crystal has stopped transmitting (the end of pulse 502). For an exemplary pulse to pulse time 510 of 200 microseconds, a typical value for velocity ADC trigger delay 508 is 50 to 100 microseconds. This value insures that there is no mechanism for the received signal to receive cross talk directly from the transmit sensor. Second, note that the trigger signal 506 will cause the velocity analog to digital converter to sample the sum of the energy returning from the Nth pulse, pulse N-1, pulse N-2, etc. For example, for a pulse repetition rate of 5 kHz, the pulse to pulse distance in water is 30 cm, resulting in an echo distance of 15 cm. Thus, a given received sample may be responsive to close by reflections from the most recent pulse and to more distant reflections from previous pulses in the pulse train. This effectively allows the signal to search through all depths of flow for the maximum velocity. Note also that the pulse rate and sample rate are the same, one signal sample for each pulse. The pulse followed by the close sample allows sensing the flow close to the sensor, 7.5 cm in the example. This close sampling is desirable for small pipes and low flow depths.

Each time wakeup timer 221 requests a velocity reading, processor 204 will take N readings from the velocity analog to digital converter 214 and store them in memory for later processing into a single velocity reading. Each transmission/reception cycle could be called a "ping". The individual N readings (or pings) are typically taken at a 5 kHz rate. N, the total number of pulses for a flow measurement, is typically a large power of 2 such as 8,192.

FIG. 6 illustrates the overall process flow diagram. In step 600, the desired digital to analog values for each time point in a ping for signal generators 206 and 210 are transferred from memory 205 into high speed memory in the ATMEL processor 204. In step 601, the first values in the table are sent to signal generators 206 and 210. They are then strobed in sync with the clock 203 thus maintaining clock coherence. In step 602, the processor waits a fixed period of time. The fixed period of time corresponds to a rate that is greater than twice Nyquist, i.e., twice the maximum Doppler frequency to be detected. For example, in step 603, the system checks to see if it is time to read velocity analog to digital converter 214. The time delay between transmitting the pulse and reading converter 214 is normally set to a value between 50 and 100µ sec as measured after the first reading of a given ping is loaded to the signal generators. If it is time for such a reading, then step 604 is executed and the converter 214 is read in sync with the coherent clock 203 and loaded into the FFT buffer. In step 605, the system checks to see if all of the steps in a particular ping have been completed. If the ping is not complete, then the system returns to step 601 and the process repeats. If the ping is complete, then the process proceeds to step 606 to check if all of the requested pings have been taken. If there are more pings to take, then the system executes step 607 thus setting the next transmit signal generator waveform table index at the beginning of the table and returns to step 601.

If there are no more pings to collect, then step 608 is executed and an FFT is performed on the data collected in the pings. For the exemplary embodiment, each of the 8192 pings generates a sample value stored in an array. The array of sequential sample values is then analyzed for spectral content. A Fast Fourier Transform (FFT) process is an efficient and preferred spectral analysis method for analyzing the array of samples. The output of the FFT process is an array of signal energy values over a corresponding spectrum.

The system then performs step 609, determination of flow direction. The system determines the flow direction by comparing the integral of the energy less than 500 Hz with the integral of the energy greater than 500 Hz. This is best illustrated by considering FIG. 7A.

Figure 7A:
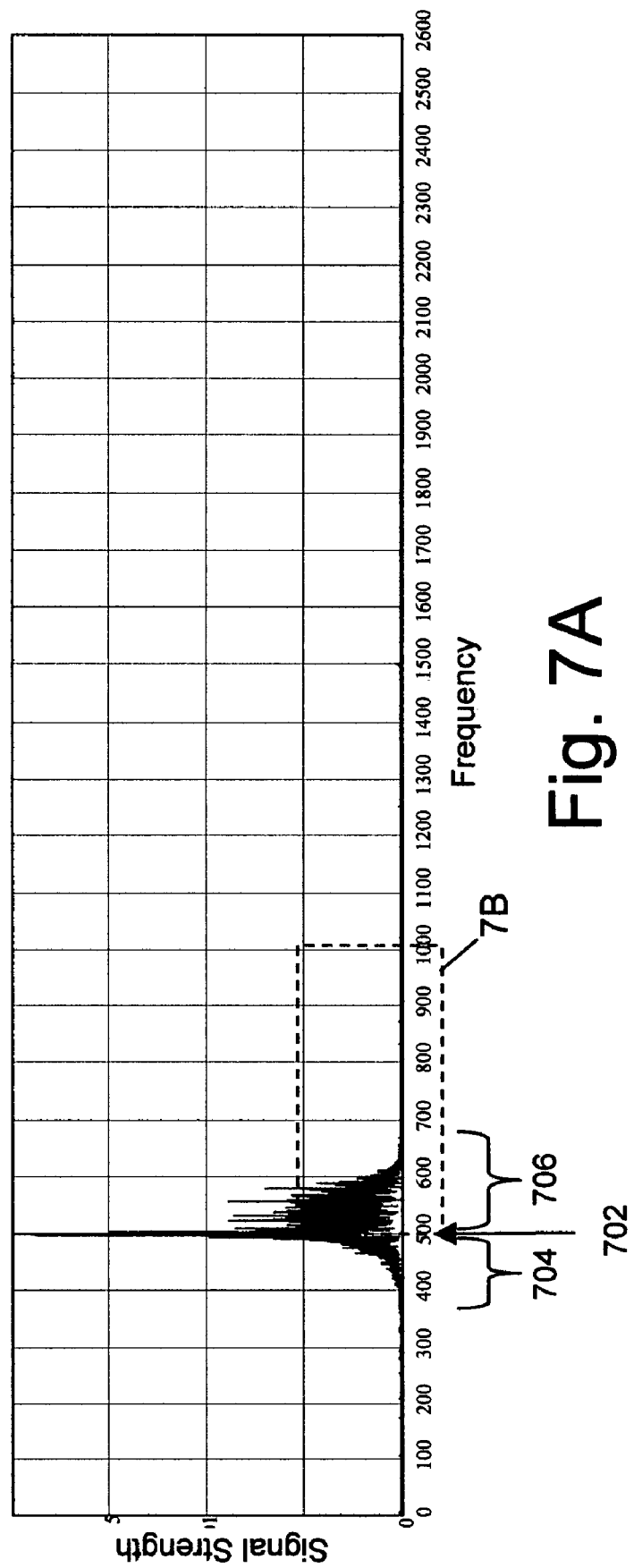
FIG. 7A shows a typical captured velocity spectrum.

FIG. 7A is an exemplary graph of the Fast Fourier Transform obtained from a typical flow. FIG. 7A shows a large signal peak 702 at 500 Hz, representing the reflection return from stationary features such as the water surface or the pipe walls. The energy above 500 Hz, 706 represents reflections from fluid discontinuities caused by features such as debris, particles, bubbles, waves or other features in the water flowing toward the sensor. The energy below 500 Hz, 704 represents reflections moving away from the sensor.

In FIG. 7A, one can clearly see that the integral of signal above 500 Hz, 706 is much greater than the integral of the signal below 500 Hz, 704. Therefore, the fluid is flowing in a positive direction, i.e. from upstream to downstream, (toward the sensor, which is pointed upstream).

Figure 7B:
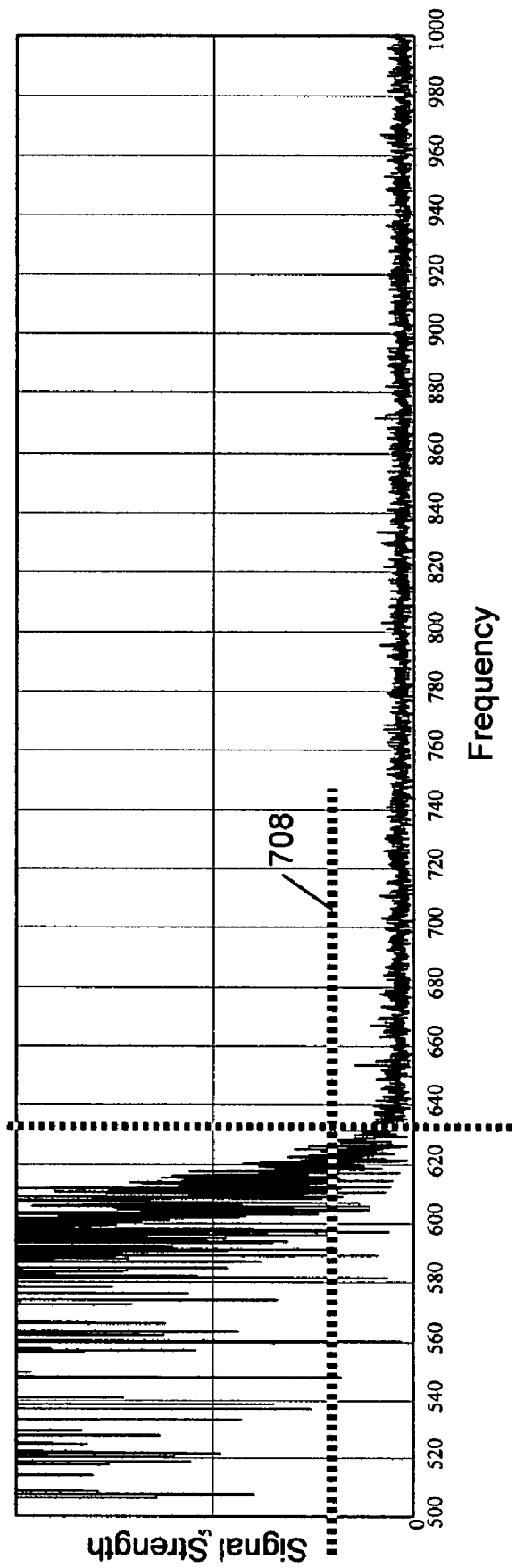
FIG. 7B shows a blow up of the FIG. 7A velocity spectrum and indicates the threshold that represents the estimate of the average velocity.

Once direction has been determined, thresh-holding step 610 is executed. The thresh-holding process is used to determine the peak velocity. This is best illustrated by considering FIG. 7B, an enlargement of FIG. 7A that focuses on the signal between 500 Hz and 1000 Hz. The enlarged section is indicated by the box 7B in FIG. 7A. One can intuitively see that the energy above 640 Hz is relatively constant and noise like. Below 620 Hz there is significant energy present suggesting that sensor is responding to a great number of particles evidencing Doppler Shifts of up to 620 Hz. The peak velocity is therefore between 620 Hz and 640 Hz. This intuitive process can be automated by using a variety of thresholding algorithms. One approach is to measure the variance of the noise at higher frequencies, establish a three sigma (three times standard deviation) threshold (visually estimated as level 708) and then trace back from higher frequencies until one finds the point on the X axis at which the energy in the Y axis is consistently higher than this thresh-hold (visually estimated as frequency 710.) The dashed cross hairs 708, 710 on the FIG. 7B illustrate this exemplary estimate of the peak velocity. One can also use a maximum entropy algorithm, Otsu's method, histogram methods, or other methods known in the art to find a similar peak velocity estimate. In practice, there exist a variety of such algorithms, all potentially yielding useful results. If the velocity is negative then this same thresholding process would be executed except that one would start from 0 Hz to establish the noise threshold and work up the spectrum toward 500 Hz to find the point where the signal exceeds the threshold. Peak velocity is then computed relative to 500 Hz. Note that the peak velocity estimate may be expressed in Hz of Doppler shift. Hz of Doppler shift may then be converted to actual velocity.

In step 611, this peak velocity estimate is converted to an average velocity using the following equation:

$$V_{avg} = 0.9 * (V_{pk} - 500)/104.03$$

Where $V_{avg}$ is the average velocity in ft/sec and $V_{pk}$ is the peak velocity estimate in Hz. 104.3 is a constant that converts Doppler shift to ft/sec velocity for a water temperature of 15° Centigrade, 59 degree F. The units are Hz/ft/sec. The constant 104.3 is derived from twice the pulse center frequency of 250 kHz divided by the velocity of sound in water of 4806 ft/sec (1465 m/sec). The factor of two is due to the round trip sound reflection path. In step 612, the average velocity value is adjusted to compensate for the actual temperature of the water. Since the speed of sound in water varies according to temperature from 1402 m/s at 0° Centigrade to 1497 m/s at 25° Centigrade, a correction for temperature can be significant. In this correction process, microprocessor 204 will sample temperature analog to digital converter 217, convert from volts to degrees and modify the 104.03 conversion factor accordingly based on well known data.

In step 613, depth of flow is measured. The specifics of this measurement are a function of the actual depth technology being employed. For purposes of illustration, it is assumed that the depth sensor used is a pressure sensor. Accordingly, microprocessor 204 will take a sample from depth analog to digital converter 218, and convert the voltage reading to a depth measurement.

In step 614, the depth of flow and velocity of flow are stored to memory 205 and will be eventually retrieved by the user through the communications system 220.

The final step 615 is optional. There are times when it is desirable to store the depth and velocity results and other times where it is desirable to additionally store the flow rate. There may even be times when only flow rate is desired. Regardless, if it is necessary to compute flow rate then it will be necessary for the user to enter configuration information that will allow the processor to convert depth of flow into cross-sectional flow area. This could be as simple as developing a lookup table that directly converts depth to area. In step 615, the depth reading taken in step 613, would then be used as an index into the depth to area table and the indicated value would then be multiplied by the average velocity computed in step 612 to provide a final flow value. Microprocessor 204 would then store the value in memory 205.

Figure 8:
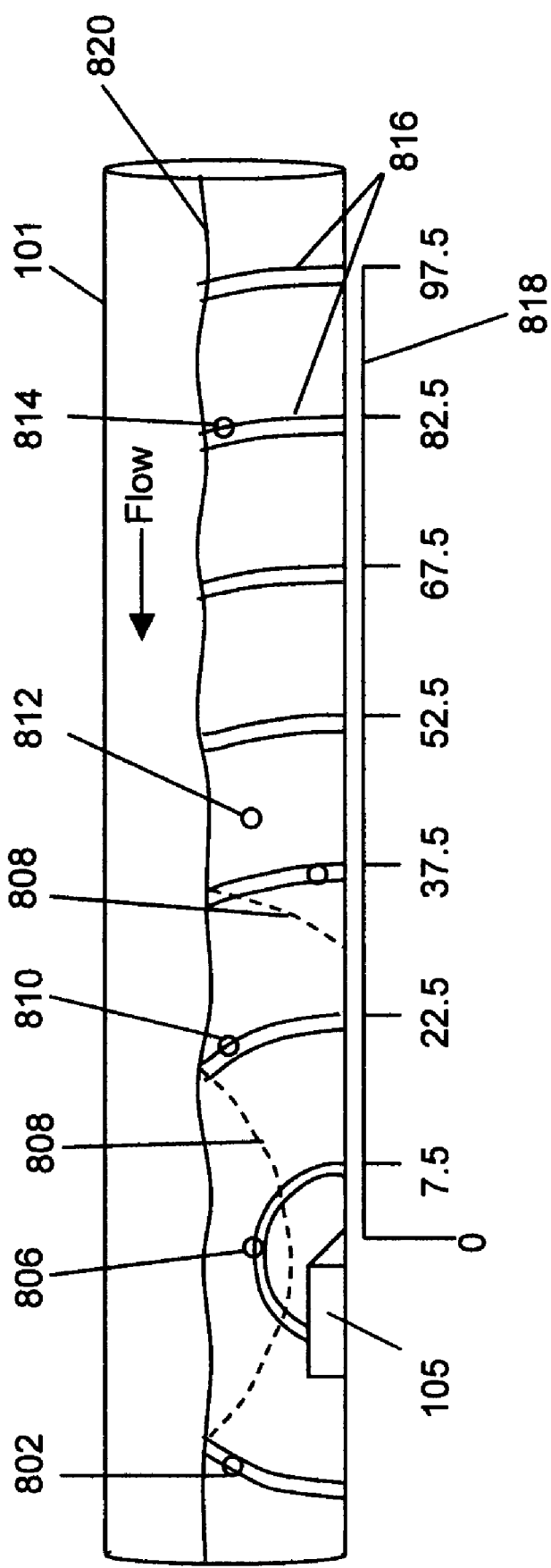
FIG. 8 illustrates a pattern of sensitive range shells produced by an exemplary embodiment of the present invention.

FIG. 8 illustrates a pattern of sensitive range shells produced by an exemplary embodiment of the present invention. Referring to FIG. 8, the transducer (sensor) is shown at the bottom of the flow in an influent pipe. The pipe 101 is partially filled with flow to water surface level 820. A series of range shells 816 corresponding to distances sensed by initial and subsequent receive samples is shown along with a corresponding scale 818 indicating the distance in centimeters for each respective sensing range shell 816. For an exemplary system with a 100 microsecond receive sampling delay 508, the first range shell is at 7.5 cm calculated from 1500 meters/second speed of sound, 100 microseconds delay and round trip propagation distance. The second and subsequent range shells have incrementally added 200 microseconds delay from the 5 kHz pulse rate as discussed in FIG. 5A-5C. Each sensing range shell has a thickness on the order of 6 cycles of 250 kHz (modified somewhat by the actual response of the sensors). Six cycles is 24 microseconds, or 1.8 cm round trip distance (indicated roughly by the thickness of each range shell 816). Primary range shells 816 are shown resulting from direct transmitted waves sampled at precise intervals. Also shown are two exemplary reflection sensing shells 808 resulting from reflected waves at 22.5 cm and 37.5 cm timing. Many other reflections and reflections of reflections are present, but not shown. Note also that the waves illuminate backwards and produce sensing shells on the back side of the sensor; however, these shells are somewhat attenuated in sensitivity due to the directivity of the transmitter and receiver crystals in the sensing unit 105. A number of exemplary particles are shown that may generate reflections used to sense velocity. Particle 814 is shown at sensing shell 82.5 cm. Particle 814 is in the best location for sensing peak velocity because particle 814 is located where the sensing shell is near perpendicular to the flow and particle 814 is at the top of the flow, where the maximum velocity (also referred to as peak velocity) is likely to occur. Particle 814, however, is distant from the sensor 105, producing a relatively weak signal. Other particles are in less ideal locations for sensing peak velocity, but contribute to the overall sensed envelope of Doppler spectral energy. Particle 806 is close to the sensor, producing a strong reflection, however, the direction of motion is tangent to the range shell, producing no Doppler shift. Particle 802 produces a Doppler shift to lower frequencies, due to the flow direction, and with a weaker response than particle 810, due to directivity of the sensor. Particle 810 produces a strong signal, but the signal is not Doppler shifted as much as the signal from particle 814 due to the non-perpendicular angle of motion through the sensing shell. Particle 812 is between shells and does not contribute to the reflected energy except possibly by reflections of reflections that are not indicated, but may be actually present.

Based on the above description in relation to FIG. 8, one can appreciate that the particles associated with peak Doppler shift are typically relatively few and far away resulting in the low amplitude signal observed at the cross hairs 710, 708 of FIG. 7B. As more of the volume of the flow is detected, the additional reflections are typically more abundant and may be closer, resulting in increasing intensity according to the envelope of intensity of FIGS. 7A and 7B.

It may also be observed that the sensing range shells accommodate a wide range of pipe diameters and flow depths. The close range shells would be dominant in small pipes and low levels because the distant range shells would be severely attenuated. The distant range shells contribute in large pipes at high fill depths where a wide area can return a larger signal and the path is less constrained. In large pipes with near full depth, the small range shell cannot reach the top of the flow, where the greatest velocity can be found. Longer distance range shells are required to reach the fastest flow and intercept the fastest flow near perpendicular to generate a maximum (peak) velocity signal. Thus, by alternately pulsing and receiving at a high rate, a pattern of sensing range shells is generated that accommodates a wide range of pipe sizes and flow depths. In a one embodiment, the first range shell should be less than the depth to be measured to avoid clutter from the surface reflection, using another criteria, an early range shell may be on the order of three times the lowest flow depth to achieve a near perpendicular wavefront at the top of the flow. Thus, the 7.5 cm range shell would be directed to a flow depth of 2.5 cm. In another criteria, a range shell should be less than ten flow depths to achieve a good return signal level relative to the clutter. Thus, a flow depth of 2.5 cm relates to a range shell within 25 cm.

In a preferred embodiment, the pulse repetition frequency is equal or greater than about 1 kHz to provide sufficient range shells to cover small, medium and large pipes. Accordingly, the pulse to sample delay should be less than 1 millisecond.

CONCLUSION

Thus, herein described is a flow sensor that accurately and economically measures flow velocity, including low flow and reverse flow, in a pipe over the full range of fill percentages without substantially interfering with the flow and may operate for extended periods in remote unattended locations.

One should understand that numerous variations may be made by one skilled in the art based on the teachings herein. Such variations include but are not limited to variations in color scheme, label text, placement and size of controls, and number of controls. The exact function of controls may be varied within a class of similar functions.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A fluid flow velocity measurement system comprising:
    an ultrasonic transmitter transmitting a pulsed signal within a body of fluid, said pulsed signal comprising a plurality of pulses, each pulse of said plurality of pulses comprising a group of cycles of discrete frequency, each pulse of said plurality of pulses followed by a period of no transmission, and each pulse of said plurality of pulses having a predetermined pulse length, said predetermined pulse length referring to a time period encompassing said group of cycles of discrete frequency and not including said period of no transmission;
    an ultrasonic receiver receiving a plurality of Doppler shifted signals from objects flowing with said fluid, said Doppler shifted signals resulting from said pulsed signal reflected from said objects flowing with said fluid; said ultrasonic receiver receiving said Doppler shifted signals during a plurality of receive time intervals, each receive time interval occurring during said period of no transmission following each pulse of said plurality of pulses transmitted by said ultrasonic transmitter; said ultrasonic receiver generating a time domain signal train from said receiving during said plurality of receive time intervals;
    said ultrasonic receiver receiving a summation of reflections resulting from at least two prior pulses of said pulsed signal during each receive time interval of said plurality of receive time intervals, said reflections resulting from at least two prior pulses being above a noise level, at least one pulse of said at least two prior pulses being transmitted before a receive interval prior to each said receive time interval;
    a time domain to frequency domain signal convener producing a spectral response of said time domain signal train;
    a detection means for finding a peak Doppler shift within said spectral response of said time domain signal train, said peak Doppler shift resulting from said Doppler shifted signals reflected from objects flowing with said fluid; and
    a computation means for finding an average flow velocity based on said peak Doppler shift.

2. The fluid flow velocity measurement system of claim 1, wherein said detection means comprises a threshold based on noise detected at frequencies above a band containing said Doppler shifted signals.

3. The fluid flow velocity measurement system of claim 1, wherein said flow is away from said sensor and said detection means comprises a threshold based on noise detected at frequencies below a band containing said Doppler shifted signals.

4. The fluid flow velocity measurement system of claim 1, wherein said average flow velocity is 0.9 times the velocity represented by the peak Doppler shift.

5. The fluid flow velocity measurement system of claim 1, further including flow cross section information wherein said computation means calculates flow rate based on said flow velocity and said flow cross section information.

6. The fluid flow velocity measurement system of claim 5, further including a depth sensor, wherein said flow cross section information includes a depth measured by said depth sensor.

7. The fluid flow velocity measurement system of claim 1, wherein said ultrasonic receiver has no carrier notch filter, further including a computation means to determine flow direction, wherein said receiver sampling occurs at an offset frequency and said computation means determines direction of flow based on an integral of said spectral response greater than said offset frequency compared with an integral of said spectral response less than said offset frequency.

8. The fluid flow velocity measurement system of claim 1, wherein the ultrasonic transmitter includes a transmitter crystal and the pulse length is sufficient to excite the transmitter crystal substantially to a steady state condition before termination of the pulse.

9. A method for measuring flow velocity within a pipe comprising:
  positioning a sensor within a body of fluid within said pipe, said sensor comprising an ultrasonic transmitter and an ultrasonic receiver aligned to transmit and receive substantially parallel to said flow;
  repetitively alternately transmitting a pulse from said ultrasonic transmitter and receiving a response with said ultrasonic receiver, said response including Doppler shifted signal returns of said pulse from discontinuities within said flow traveling at said flow velocity;
  said pulse comprising a group of cycles of discrete frequency transitioning to a period of no transmission, said pulse followed by said period of no transmission during which said response is received with said ultrasonic receiver, and said pulse having a predetermined pulse length, said predetermined pulse length referring to a time period encompassing said group of cycles of discrete frequency and not including said period of no transmission;
  said receiving said response with said ultrasonic receiver comprising sampling said response at a predetermined delay from said pulse from said ultrasonic transmitter; each said response comprising a summation of reflections resulting from a plurality of pulses of said repetitively transmitted pulses, said summation of reflections comprising reflections from at least two pulses of said plurality of pulses wherein each reflection from said at least two pulses results in a received signal above a noise level;
  assembling a sequence of said receiver response samples in a time domain data set;
  converting said time domain data set to a frequency domain data set;
  finding a peak Doppler shift corresponding to said Doppler shifted signals based on said frequency domain data set; and
  computing with a computation means an average flow velocity based on said peak Doppler shift.

10. The method according to claim 9, wherein the step of finding a peak Doppler shift comprises finding a threshold based on noise detected at frequencies above said Doppler shifted signals.

11. The method according to claim 9, wherein said flow is away from said sensor and the step of finding a peak Doppler shift comprises finding a threshold based on noise detected at frequencies below said Doppler shifted signals.

12. The method according to claim 9, wherein said average flow velocity is 0.9 times the velocity represented by the peak Doppler shift.

13. The method according to claim 9, further including flow cross section information, further including the step of computing flow rate based on said flow velocity and said flow cross section information.

14. The method according to claim 9, further including a depth sensor, wherein said flow cross section information includes a depth measured by said depth sensor.

15. The method according to claim 9, wherein said receiver sampling occurs at an offset frequency, further including the step of computing direction of flow based on an integral of said frequency domain data greater than said offset frequency compared with an integral of said frequency domain data less than said offset frequency.

16. The method according to claim 9, wherein the pulse repetition frequency is greater than 1 kHz and the delay is less than 1 millisecond.

17. The method according to claim 9, wherein the ultrasonic frequency is between 100 kiloHertz and 2 megaHertz.

18. The method according to claim 17, wherein the length of said pulse comprises a time interval having a range from a minimum of four cycles to a maximum of ten cycles at said ultrasonic frequency.

19. A system for measuring fluid flow within a body of fluid comprising:
  an ultrasonic transceiver comprising an ultrasonic transmitter and an ultrasonic receiver, said ultrasonic transceiver generating a sequence of pings, each ping of said sequence of pings comprising said ultrasonic transmitter sending a single pulse within said body of fluid followed by said ultrasonic receiver receiving a single sample of received ultrasonic energy from said body of fluid; said single pulse comprising a group of cycles of discrete frequency transitioning to a period of no transmission, said single pulse followed by said period of no transmission during which said ultrasonic receiver receives said single sample of received ultrasonic energy; said received ultrasonic energy comprising a plurality of Doppler shifted signals from objects flowing with said fluid, said Doppler shifted signals resulting from said sequence of pings; said sequence of pings having a fixed time between sequential ping s of said sequence of ping s, said fixed time being shorter than a time required to transmit a pulse and receive a resulting reflection from an object at a maximum range from the transceiver;
  said ultrasonic receiver generating a time domain signal sequence from said received samples of said sequence of pings;
  a time domain to frequency domain signal converter producing a spectral response of said time domain signal sequence;
  a detection means for finding a peak Doppler shift within said spectral response of said time domain signal sequence, said peak Doppler shift resulting from said Doppler shifted signals reflected from objects flowing with said fluid; and
  a computation means for finding an average flow velocity based on said peak Doppler shift.

* * * * *